017;3,235,622
CONDENSATION PRODUCTS AND COATING COMPOSITIONS THEREOF
David H. Clemens, Willow Grove, and Dominic R. Falgiatore, Philadelphia, Pa., assignors to Rohm & Haas Company, Philadelphia, Pa., a corporation of Delaware
No Drawing. Filed Sept. 1, 1960, Ser. No. 53,379
22 Claims. (Cl. 260—856)

The present invention is concerned with novel condensation products and coating compositions formed therefrom adapted to produce durable, detergent-resistant coatings of outstanding quality.

The Frazier Patent 2,681,897 discloses coating compositions comprising copolymers of 5 to 50 mole percent of a monomer containing a hydroxyl group with various alkylated aminoplast resins. It has been found that when compositions of this type in which the copolymer contains from 5 to 30% by weight of the monomer containing hydroxyl group are used in conjunction with a butylated melamine-formaldehyde condensate, coatings are obtained which are of poor quality because of incompatibility between the aminoplast and copolymer component. This incompatibility is found to occur frequently even though the coating composition containing the copolymer and the aminoplast appears to be compatible before it is applied to the substrates coated. Attempts to avoid the difficulty with incompatibility by adjusting the baking conditions or curing conditions to which the coatings are subjected have not been found satisfactory or successful. The improved coating compositions disclosed in a copending application of Falgiatore and Levantin, Serial No. 785,798, filed January 9, 1959, now Patent 3,082,184, in which the hydroxyl-containing component of the copolymer is a β-hydroxypropyl acrylate or methacrylate, are greatly improved in this respect. However, these coatings too occasionally develop incompatibility though not to the extent developed in the compositions of the patent.

In accordance with the present invention, it has been found that the difficulties with incompatibility can be overcome without loss in other advantageous properties of the coatings obtained from the compositions when suitable reaction is effected between the aminoplast condensate and either the copolymer or its monomeric components after or during copolymerization respectively. In one aspect of the invention, therefore, a butylated melamine-formaldehyde condensate is introduced into the free-radical-catalyzed mixture of monomers so that in effect some grafting of the monomers on the aminoplast condensate may occur. In another aspect of the invention, the completed copolymer is mixed with the butylated melamine-formaldehyde condensate and the two components are coreacted. It has been found that the condensation products obtained in either of these ways are free of the difficulties with incompatibility.

The present invention, therefore, enables one to obtain improved products using butylated melamine-formaldehyde condensates which are, in comparison to other aminoplasts of the alkylated urea-formaldehyde type, characterized by (a) outstanding exterior durability, (b) more versatility in that the coatings have better resistance to heat and hence are not as susceptible to be overbaked, (c) better resistance to alkalies and detergents, and (d) more rapid curing.

The copolymers that may be employed in the compositions of the present invention are those containing 5 to 30% by weight of β-hydroxyethyl, β-hydroxypropyl, or γ-hydroxypropyl acrylate or methacrylate or mixtures of such hydroxyl-containing monomers. The copolymers may contain from 1 to 4% by weight of a copolymerizable α,β-unsaturated carboxylic acid and it, of course, must contain at least one other copolymerizable monoethylenically unsaturated compound containing an

group which latter comonomer is devoid of hydroxyl groups. As the acid component, if it is used, and it is preferably used, the following acids are suitable: maleic acid, fumaric acid, aconitic acid, citraconic acid, crotonic acid; but for most practical purposes, acrylic acid, methacrylic acid, or itaconic acid is preferred.

Other monoethylenically unsaturated compounds copolymerizable with the hydroxyl and/or acidic monomers which may be used include esters of acrylic acid or methacrylic acid with cyclohexanol, benzyl alcohol, or alkanols having 1 to 18 carbon atoms, such as ethyl acrylate, methyl methacrylate, butyl methacrylate, 2-ethylhexyl acrylate, and the like; acrylonitrile or methacrylonitrile, styrene, vinyltoluene, α-methylstyrene, and so on. The hardness, flexibility, toughness, and adhesion for various substrates can be varied widely as desired by suitably adjusting the proportions of these various monomers. For example, a copolymer containing 94% by weight of an ester of acrylic acid such as methyl, ethyl, or butyl acrylate with 5% by weight of β-hydroxypropyl acrylate or methacrylate and 1% by weight of one of the acids mentioned produces films which are extremely flexible and adherent. On the other hand, a copolymer of 94% by weight of methyl methacrylate with 5% by weight of β-hydroxypropyl acrylate or methacrylate and 1% by weight of one of the acids produces an extremely hard film, which is suitable for relatively rigid substrates but is insufficiently flexible to be applied to highly flexible substrates such as of paper, leather, or textiles.

When the copolymers are prepared separately before mixing with the butylated methylol melamine resin-forming condensate, they may be prepared in any suitable fashion.

They should have a molecular weight in the range of about 10,000 to about 130,000 viscosity average and for this purpose solution polymerization, particularly in a solvent which may be employed as the solvent for the coating application, is generally preferred. The monomers comprising the hydroxyalkyl acrylate or methacrylate, the unsaturated acid, if used, and the other monoethylenically unsaturated compounds in the proportions needed to give the composition hereinabove defined, are mixed in the solvent at a concentration of about 10 to 60% by weight total monomer in the entire solution and any suitable free-radical initiator soluble in the solvent is introduced. The initiator may be an azo catalyst, a peroxygen compound, such as t-butyl peracetate, or a peroxide, such as benzoyl peroxide, or a hydroperoxide, such as t-butyl hydroperoxide, or cumene hydroperoxide. The solution is heated to reflux to effect copolymerization and held at reflux for a period of 2 to 6 hours or more.

The alkylated aminoplast used is the butylated melamine-formaldehyde condensates in which 2 to 4 methylol groups are alkylated with n-butanol or isobutanol. The melamine-formaldehyde to be butylated may contain from 3 to 6 methylol groups before alkylation. The preparation of the butylated melamine-formaldehyde condensates is no part of the present invention as it is well known and such products are available commercially.

The proportions between the butylated melamine-formaldehyde condensate and the copolymer are in the range of 15 to 60% by weight of the aminoplast and 85 to 40% by weight respectively of the copolymer. A preferred range is 25 to 50% by weight of aminoplast to 75 to 50% by weight respectively of the copolymer.

In forming the condensation product between the copolymer and the aminoplast, the butylated melamine-formaldehyde condensate and the copolymer are mixed in a suitable solvent in any order providing a concentration of the mixture of copolymer and aminoplast in any proportion from 1% by weight up to saturation. Solvents that may be employed include such hydrocarbons as benzene, toluene, xylenes, and aromatic naphthas or mixtures of such solvents; esters such as ethyl, butyl, amyl, ethoxyethyl, or methoxyethyl acetates, lactates, or propionates; ketones such as acetone, methyl isopropyl ketone, methyl isobutyl ketone, dioxane, isophorone, and cyclohexanone; alcohols such as n-butanol, t-butanol, isopropyl alcohol, n-propyl alcohol, amyl alcohols, and cyclohexanol; ethers such as diethyl ether, the monoethyl ether of ethylene glycol, the monomethyl ether of ethylene glycol, and the monobutyl ether of ethylene glycol; and miscellaneous solvents including dimethylformamide, dimethylacetamide, acetonitrile, nitromethane, nitroethane, nitropropane, and nitrobutane; as well as mixtures of two or more solvent materials either from the same group or any or all of the groups just listed.

The mixture of copolymer and aminoplast in the solvent is heated to a temperature of 50° to 140° C. and maintained in this range of temperature until the mixture appears to be compatible and, upon testing by spraying a film of the mixture on a suitable base and baking at a temperature of 150° C. for 30 minutes, a compatible film is obtained. Thus, the coreaction is carried out for such a length of time that the coating composition itself exhibits compatibility between its components; and the film obtained by the usual baking procedure, as stated hereinabove, provides a compatible product. The time of reaction may vary from one-half hour to twenty-four hours or more depending upon the temperature at which it is effected. In any event, the reaction is not carried so far as to produce a gelled product. In other words, the coreaction product or condensation product obtained is still in a soluble form.

The coreaction product thus obtained may be used as is or diluted with additional solvent. If desired, an acidic catalyst may be added. However, this is generally unnecessary since the butylated melamine-formaldehyde condensate generally contains residual acid and in preferred instances, the copolymer contains acid even though it is bound up in the polymer itself. In addition, pigments, dyes, and thickeners may be included if and as desired.

It is believed that the reaction effected between the copolymer and the aminoplast involves a transetherification, but it is to be understood that the invention is not to be limited to any particular theory of operation.

An alternative embodiment is that in which the copolymer is prepared in the presence of the alkylated melamine-formaldehyde condensate. In this system, the aminoplast condensate is dissolved in a suitable inert solvent, such as any of those mentioned hereinabove, at concentrations of 1% by weight to saturation. The temperature of the mixture may be raised to 50° to 140° C. and the free-radical-catalyzed monomer mixture (with or without additional solvent) may be introduced gradually into the heated solution of the aminoplast while maintaining the temperature of 50° to 140° C. The amount of monomers added is such as to provide a proportion of 15 to 60% by weight of butylated melamine-formaldehyde condensate and 85 to 40% by weight respectively of the copolymer. As the initiator for the polymerization, any free-radical catalyst soluble in the medium may be employed such as the usual azo catalysts, peroxide or hydroperoxide catalysts. The amount of free-radical initiator may be from ½ to 3% by weight of the monomers. No catalyst is needed for the reaction except the free-radical catalyst to effect the copolymerization. The time for the polymerization may range from about 8 to 30 hours, preferably 12 to 24 hours depending on the batch size; and additional free-radical polymerization initiator may be introduced at various intervals during the polymerization. The system is usually compatible by the time 12 hours reaction has been effected though in some cases, a lesser time may be sufficient. However, the reaction may be carried further provided a gelled product is not obtained. The graft copolymer should, in all events, be soluble in character. As in the previous case, where the completed copolymer is coreacted with the aminoplast, the coreaction in this case is effected until compatibility is obtained and this is checked by spreading a film of the graft copolymer on a substrate and baking at 150° C. for 30 minutes. Heating of the reaction mixture is carried out until the film obtained after baking exhibits compatibility.

In both embodiments the reaction product obtained is a clear, homogeneous, compatible mixture which upon deposition as a film and baking thereof forms a compatible coating. The composition obtained in both cases may be modified (a) by the addition of an acidic catalyst though this is not essential, particularly when the copolymer contains acid groups, (b) by additional solvent to form the proper concentration for coating, or (c) by pigments and dyes.

The concentration of the mixture of copolymer and aminoplast in the solvent may be from 1 to 60% by weight, depending on the method of application and the thickness of coating desired. If a pigment is present, the total solids concentration in the composition may be from 5 to 75% by weight. The ratio of pigment to binder (using the latter term to embrace the copolymer and the aminoplast condensate) may be from 1:20 to 20:1.

Pigments suitable for use according to the invention are inorganic pigments such as, for example, chrome yellows, Prussian blues and Brunswick greens, titanium pigments such as titanium dioxide, extended titanium pigments (extended with either precipitated or natural extenders, such as alkali earth sulphates for instance calcium sulphate, barium sulphate, and the like), tinted titanium pigments, titanates such as barium, zinc, lead, magnesium titanates, and the like. Additionally, other types of inorganic pigments might be included, such as zinc sulphide pigments, for instance, zinc sulphide, lithopone, other extended zinc sulphide pigments, such as calcium base lithopone, zinc sulphide extended with natural extenders, and the like, zinc oxide and antimony oxide, or organic pigments, that is organic coloring matters which are devoid of sulphonic, carboxylic, or other water-solubilizing groups. Also, for the purposes of this invention, we include within the term "pigment" other water-insoluble organic coloring matters such as, for example, the calcium or barium lakes of azo lake dyestuffs.

The compositions of the present invention are adapted to be applied in any suitable fashion to the substrate to be coated such as by brushing, spraying, dipping, roller coating, or the like, then dried and finally cured by baking. Generally, it is unnecessary to add any other material to catalyze the reaction but, if desired, an acidic catalyst may be included. The amount of such a catalyst may be from 0.1 to 1% by weight, based on the weight of aminoplast condensate. The use of the curing catalyst may be particularly desirable when lower temperatures of curing or baking are needed. With such curing catalysts, insolubilization can be accomplished simply by drying and ageing at room temperature. Amongst the curing catalysts that may be used, if desired, to cure the composition of the present invention are any of the acid catalysts and, included in that group, are the organic and the inorganic acid catalysts. One may use, for instance, in catalytic amounts, sulfuric acid, hydrochloric acid and their acid salts, such as ammonium sulfate, ammonium chloride, or the organic acids, such as acetic acid, phthalic acid, benzoic acid, toluene sulphonic acid, naphthalene sulphonic acid, and the mono-salt of maleic acid with triethylamine. However, as stated before, such curing catalysts are not essential.

The compositions herein may be applied for the coating of a wide variety of substrates including paper, textiles, leather, wood, ceramics, brick, stone, and concrete surfaces, as well as metals. They are particularly valuable for application as finishing topcoats for automobiles or for the decoration of metals in general, such as tin cans or other cannisters.

As stated above, the compositions, after application to the substrate to be coated, are dried and cured. If a curing catalyst is present, such drying and curing may be carried out simply at room temperatures. However, whether or not a catalyst is present, drying may be effected at elevated temperatures such as at 140° F. up to 220° F.; and baking may be effected at temperatures anywhere from 180° to 450° F. As is obvious from the preceding statement, drying and curing may be considered as part of one operation, the curing following the drying immediately. The time of curing may vary from a period as short as one-half to two minutes at the upper range of temperature around 450° F. up to one hour or two at the lower portion of the temperature range given, namely 180° F. A particularly practical curing operation is effected at 300° F. for a period of 15 to 30 minutes or so.

The example immediately following illustrates the preparation of a representative butylated polymethylol melamine condensate that can be employed herein. The parts and percentages are by weight unless otherwise clearly indicated.

EXAMPLE A (RESIN A)

126 parts of melamine and 405.5 parts of formalin (a 37% aqueous solution of formaldehyde) and 440 parts of n-butanol are introduced into a suitable reaction chamber equipped with thermometer, stirrer, reflux condenser, and a suitable water trap through which the reflux condensate passes on its return to the reaction chamber and in which the essentially aqueous fraction of the condensate may be separated from the essentially non-aqueous fraction. Means are provided so that the former fraction may be drawn off if desirable. The reaction mixture is refluxed to a temperature of about 91° to 93° C. at atmospheric pressure for 6 to 8 hours. The water is removed by azeotropic distillation from the reaction mixture during the reflux operation. The vapor temperature will be about 100° to 105° C. The pressure is lowered sufficiently to reduce the vapor temperature to about 85° to 90° C. and the resin solution is concentrated to about 50% solids by vacuum distillation.

Example 1

A copolymer charge comprising 263.5 grams (36.1 weight percent) of methyl methacrylate; 263.5 grams (36.1 weight percent) of styrene; 108.1 grams (14.8 weight percent) of ethyl acrylate; 80.3 grams (11.0 weight percent) of β-hydroxypropyl methacrylate; 14.6 grams (2.0 weight percent) of itaconic acid; 10.95 grams (1.5% of total monomer charge) of benzoyl peroxide; and 164.0 grams of 2-methoxyethanol is added in the course of two hours to a glass reaction vessel containing 566.0 grams of xylene maintained at 105° to 107° C. by means of external heating. The mixture in the flask is stirred during the addition and subsequent reaction and maintained at 105° to 107° C. under a nitrogen atmosphere. Two and a half hours after the polymerization has started the reaction is recatalyzed with 0.73 gram of additional benzoyl peroxide and the temperature maintained at 109° to 110° C. At the end of the fourth hour, the reaction is again recatalyzed with an additional 0.73 gram of benzoyl peroxide. Continued heating for a total of twelve hours completes the polymerization cycle. The reaction is then cooled immediately to 80° C., and a charge of 486.6 grams of the 50% butylated melamine-formaldehyde condensate resin solution (Resin A above) is added to the reaction flask. Heating and stirring are again continued and the temperature maintained at 80° C. Compatibilization between the copolymer and the alkylated aminoplast resin is effected in one hour. This was established from a clear 25-mil wet film cast on glass and baked for one hour at 150° C. In contrast, a hazy film was produced from a cold blended mixture of the above resin components. The final resin is a clear, viscous solution having a viscosity of about 10 poises at approximately 50% resin solids in a xylene/2-methoxyethanol/n-butanol (58.2/16.8/25.0 weight ratio) solvent system. It is essentially a coreacted blend containing 75.0% by weight of the above copolymer and 25.0% of the alkylated aminoplast resin.

Example 2

The procedure of Example 1 is repeated with the following modifications:

The charge of the 50% butylated melamine-formaldehyde condensate resin solution is increased to 730.0 grams, and the 80° C. heating period is extended to eight hours.

The above proportions of copolymer and alkylated aminoplast resin yield a clear, viscous resin solution having a viscosity of 7.4 poises at approximately 50% resin solids in a xylene/n-butanol/2-methoxyethanol (51.7/33.3/15.0 weight ratio) solvent system. The final composition which yields a clear 25-mil baked film on glass is essentially a coreacted blend containing 50.0% by weight of the above copolymer and 50.0% of the alkylated aminoplast resin.

Example 3

The procedure of Example 1 is repeated with the following modifications:

The charge comprising monomers and catalyst is added in the course of two hours to a glass reaction vessel containing both 566.0 grams of xylene, and 486.6 grams of a 50% butylated melamine-formaldehyde condensate resin solution. Otherwise, the polymerization conditions remain unaltered, and the total heating time is twelve hours.

Example 4

A copolymer charge comprising 270.0 grams (45.0 weight percent) of methyl methacrylate; 270.0 grams (45.0 weight percent) of ethyl acrylate; 60.0 grams (10.0 weight percent) of β-hydroxyethyl methacrylate; and 12.0 grams (2.0% of total monomer charge) of benzoyl peroxide is added in the course of two hours to a glass reaction vessel containing both 600.0 grams of toluene and 372.0 grams of a butylated melamine-formaldehyde condensate resin solution (obtained as in Example A but at a 53.8% concentration) maintained at 105° to 107° C. by means of external heating. The mixture in the flask is stirred during the addition and subsequent reaction and maintained at 105° to 107° C. under a nitrogen atmosphere. Two and a half hours after the polymerization has started the reaction is recatalyzed with 0.60 gram of additional benzoyl peroxide and the temperature maintained at 109° to 110° C. At the end of the fourth hour, the reaction is again recatalyzed with an additional 0.60 gram of benzoyl peroxide. Continued heating for a total of twelve hours completes the polymerization cycle, and compatibilization between the copolymer and the alkylated aminoplast resin is effected. This was established from a clear 25-mil wet film cast on glass and baked for one hour at 150° C. In contrast, a hazy film was produced from a cold blended mixture of the above resin components. The final resin is a clear, viscous solution having a viscosity of 8 poises at approximately 50% resin solids in toluene/n-butanol (77.7/22.3 weight ratio) solvent system. It is essentially a coreacted blend containing 75.0% by weight of the above copolymer and 25.0% of the alkylated aminoplast resin.

Example 5

The procedure of Example 1 is repeated with the following modification:

A charge of 270.0 grams of styrene is substituted for the methyl methacrylate.

The above proportions of copolymer and alkylated aminoplast resin yield a clear, viscous resin solution having a viscosity of 3.5 poises at approximately 50% resin solids in a toluene/n-butanol (77.7/22.3 weight ratio) solvent system. The final composition which yields a clear 25-mil baked film on glass is essentially a coreacted blend containing 75.0% by weight of the above copolymer and 25.0% of the alkylated aminoplast resin.

Example 6

A copolymer charge comprising 535.5 grams (76.5 weight percent) of ethyl acrylate; 157.5 grams (22.5 weight percent) of β-hydroxyethyl methacrylate; 7.0 grams (1.0 weight percent) of methacrylic acid; 14.0 grams (2.0% of total monomer charge) of benzoyl peroxide is added in the course of two hourse to a glass reaction vessel containing 700.0 grams of toluene maintained at 105° to 107° C. by means of external heating. The mixture in the flask is stirred during the addition and subsequent reaction and maintained at 105° to 107° C. under a nitrogen atmosphere. Two and a half hours after the polymerization has started the reaction is recatalyzed with 0.70 gram of additional benzoyl peroxide and the temperature maintained at 109° to 110° C. At the end of the fourth hour, the reaction is again recatalyzed with an additional 0.70 gram of benzoyl peroxide. Continued heating for a total of twelve hours completes the polymerization cycle. The reaction is then cooled immediately to 80° C., and a charge of 433.6 grams of a 53.8% butylated melamine-formaldehyde condensate resin solution (obtained as in Example A) is added to the reaction flask. Heating and stirring are again continued and the temperature maintained at 80° C. Compatibilization between the copolymer and the alkylated aminoplast resin is effected in seven hours. This was established from a clear 25-mil wet film cast on glass and baked for one hour at 150° C. In contrast, a hazy film was produced from a cold blended mixture of the above resin components. The final resin is a viscous solution having a viscosity of about 2.7 poises at approximately 50% resin solids in a toluene/n-butanol (77.8/22.2 weight ratio) solvent system. It is essentially a coreacted blend containing 75.0% by weight of the above copolymer and 25.0% of the alkylated aminoplast resin.

Example 7

A copolymer charge comprising 50.75 grams (7.25 weight percent) of methyl methacrylate; 50.7 grams (7.25 weight percent) of styrene; 381.5 grams (54.5 weight percent) of ethyl acrylate; 210.0 grams (30.0 weight percent) of β-hydroxyethyl methacrylate; 7.0 grams (1.0 weight percent) of methacrylic acid; 14.0 grams (2.0% of total monomer charge) of benzoyl peroxide is added in the course of two hours to a glass reaction vessel containing 490.0 grams of toluene and 210.0 grams of diacetone alcohol maintained at 105° to 107° C. by means of external heating. The mixture in the flask is stirred during the addition and subsequent reaction and maintained at 105° to 107° C. under a nitrogen atmosphere. Two and a half hours after the polymerization has started the reaction is recatalyzed with 0.70 gram of additional benzoyl peroxide and the temperature maintained at 109° to 110° C. At the end of the fourth hour, the reaction is again recatalyzed with an additional 0.70 gram of benzoyl peroxide. Continued heating for a total of twelve hours completes the polymerization cycle. The reaction is then cooled immediately to 80° C., and a charge of 433.6 grams of 53.8% butylated melamine-formaldehyde condensate resin solution obtained as in Example A is added to the reaction flask. Heating and stirring are again continued and the temperature maintained at 80° C. Compatibilization between the copolymer and the alkylated aminoplast resin is effected in ten hours. This was established from a clear 25-mil wet film cast on glass and baked for one hour at 150° C. In contrast, a hazy film was produced from a cold blended mixture of the above resin components. The final resin is a clear, viscous solution having a viscosity of 10 poises at approximately 50% resin solids in a toluene/diacetone alcohol/n-butanol (54.4/23.4/22.2 weight ratio) solvent system. It is essentially a coreacted blend containing 75.0% by weight of the above copolymer and 25.0% of the alkylated aminoplast resin.

We claim:

1. A composition comprising a solution in an organic solvent of a product selected from the group consisting of
   (A) condensation products, obtained by heating a solution in an organic solvent, at a temperature of about 50 to 140° C., for a period of at least about a half hour, but short of that resulting in gelation, until the solution clears and is capable of forming a clear film on baking at 150° C. for 30 minutes, of a mixture of
      (1) 15 to 60% by weight of a butylated polymethylol melamine and
      (2) 85 to 40% by weight respectively of a copolymer of a mixture of (a) at least one copolymerizable monoethylenically unsaturated monomer and (b) 5 to 30% by weight of a compound of the formula

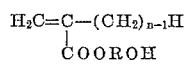

wherein $n$ is an integer having a value of 1 to 2 and R is an alkylene group having 2 to 3 carbon atoms and having at least 2 carbon atoms extending in a chain adjacent oxygen atoms and
   (B) reaction products obtained by copolymerizing, at a temperature of about 50 to 140° C. for a period of at least about 8 hours, but short of that resulting in gelation, until the product forms a clear film on baking at 150° C. for 30 minutes, a mixture of (a) at least one polymerizable monoethylenically unsaturated monomer and (b) 5 to 30% by weight of a compound of the formula

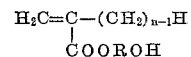

wherein $n$ is an integer having a value of 1 to 2 and R is an alkylene group having 2 to 3 carbon atoms and having at least 2 carbon atoms extending in a chain between adjacent oxygen atoms, in a solution containing, dissolved therein, a butylated polymethylol melamine condensate and a free-radical polymerization initiator, the amount of condensate being from 15 to 60% by weight of the total weight of condensate and monomers, and the amount of free-radical initiator being from ½ to 3% by weight of the monomers.

2. A composition comprising a solution in an organic solvent of a condensation product obtained by heating a solution in an organic solvent, at a temperature of about 50 to 140° C. for a period of at least about a half hour, but short of that resulting in gelation, until the solution clears and is capable of forming a clear film on baking at 150° C. for 30 minutes, of a mixture of (1) 15 to 60% by weight of a butylated polymethylol melamine and (2) 85 to 40% by weight respectively of a copolymer of a mixture of (a) at least one copolymerizable monoethylenically unsaturated monomer and (b) 5 to 30% by weight of a compound of the formula

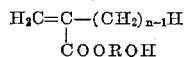

wherein $n$ is an integer having a value of 1 to 2 and R is an alkylene group having 2 to 3 carbon atoms and having at least 2 carbon atoms extending in a chain between adjacent oxygen atoms.

3. A composition comprising a solution in an organic solvent of a reaction product obtained by copolymerizing, at a temperature of about 50 to 140° C. for a period of at least about 8 hours, but short of that resulting in gelation, until the product forms a clear film on baking at 150° C. for 30 minutes, a mixture of (a) at least one copolymerizable monoethylenically unsaturated monomer and (b) 5 to 30% by weight of a compound of the formula $$H_2C=C-(CH_2)_{n-1}H$$
$$\phantom{H_2C=}|$$
$$\phantom{H_2C=}COOROH$$

wherein $n$ is an integer having a value of 1 to 2 and R is an alkylene group having 2 to 3 carbon atoms and having at least 2 carbon atoms extending in a chain between adjacent oxygen atoms, in a solution containing, dissolved therein, a butylated polymethylol melamine condensate and a free-radical polymerization initiator, the amount of condensate being from 15 to 60% by weight of the total weight of condensate and monomers, and the amount of free-radical initiator being from ½ to 3% by weight of the monomers.

4. A composition comprising a solution in an organic solvent of a reaction product obtained by copolymerizing, at a temperature of about 50 to 140° C. for a period of at least about 8 hours, but short of that resulting in gelation, until the product forms a clear film on baking at 150° C. for 30 minutes, a mixture of copolymerizable monoethylenically unsaturated monomers comprising at least one ester of an acid of the formula $$H_2C=C-(CH_2)_{n-1}H$$
$$\phantom{H_2C=}|$$
$$\phantom{H_2C=}COOH$$

with a monohydric alcohol having 1 to 18 carbon atoms and 5 to 30% by weight of a compound of the formula $$H_2C=C-(CH_2)_{n-1}H$$
$$\phantom{H_2C=}|$$
$$\phantom{H_2C=}COOROH$$

wherein $n$ is an integer having a value of 1 to 2 and R is an alkylene group having 2 to 3 carbon atoms and having at least 2 carbon atoms extending in a chain between adjacent oxygen atoms, in a solution containing, dissolved therein, a butylated polymethylol melamine condensate and a free-radical polymerization initiator, the amount of condensate being from 15 to 60% by weight of the total weight of condensate and monomers, and the amount of free-radical initiator being from ½ to 3% by weight of the monomers.

5. A composition comprising a solution in an organic solvent of a reaction product obtained by copolymerizing, at a temperature of about 50 to 140° C. for a period of at least about 8 hours, but short of that resulting in gelation, until the product forms a clear film on baking at 150° C. for 30 minutes, a mixture of copolymerizable monoethylenically unsaturated monomers comprising at least one ester of an acid of the formula $$H_2C=C-(CH_2)_{n-1}H$$
$$\phantom{H_2C=}|$$
$$\phantom{H_2C=}COOH$$

with a monohydric alcohol having 1 to 18 carbon atoms, about 1 to 4% by weight of a copolymerizable α,β-unsaturated carboxylic acid, and 5 to 30% by weight of a compound of the formula $$H_2C=C-(CH_2)_{n-1}H$$
$$\phantom{H_2C=}|$$
$$\phantom{H_2C=}COOROH$$

wherein $n$ is an integer having a value of 1 to 2 and R is an alkylene group having 2 to 3 carbon atoms and having at least 2 carbon atoms extending in a chain between adjacent oxygen atoms, in a solution containing, dissolved therein, a butylated polymethylol melamine condensate and a free-radical polymerization initiator, the amount of condensate being from 15 to 60% by weight of the total weight of condensate and monomers, and the amount of free-radical initiator being from ½ to 3% by weight of the monomers.

6. A composition comprising a solution in an organic solvent of a reaction product obtained by copolymerizing, at a temperature of about 50 to 140° C. for a period of at least about 8 hours, but short of that resulting in gelation, until the product forms a clear film on baking at 150° C. for 30 minutes, a mixture of copolymerizable monoethylenically unsaturated monomers comprising at least one ester of an acid of the formula $$H_2C=C-(CH_2)_{n-1}H$$
$$\phantom{H_2C=}|$$
$$\phantom{H_2C=}COOH$$

with a monohydric alcohol having 1 to 18 carbon atoms, styrene, about 1 to 4% by weight of a copolymerizable α,β-unsaturated carboxylic acid, and 5 to 30% by weight of a compound of the formula $$H_2C=C-(CH_2)_{n-1}H$$
$$\phantom{H_2C=}|$$
$$\phantom{H_2C=}COOROH$$

wherein $n$ is an integer having a value of 1 to 2 and R is an alkylene group having 2 to 3 carbon atoms and having at least 2 carbon atoms extending in a chain between adjacent oxygen atoms, in a solution containing, dissolved therein, a butylated polymethylol melamine condensate and a free-radical polymerization initiator, the amount of condensate being from 15 to 60% by weight of the total weight of condensate and monomers, and the amount of free-radical initiator being from ½ to 3% by weight of the monomers.

7. A composition comprising a solution in an organic solvent of a reaction product obtained by copolymerizing, at a temperature of about 50 to 140° C. for a period of at least about 8 hours, but short of that resulting in gelation, until the product forms a clear film on baking at 150° C. for 30 minutes, a mixture of copolymerizable monoethylenically unsaturated monomers comprising at least one ester of an acid of the formula $$H_2C=C-(CH_2)_{n-1}H$$
$$\phantom{H_2C=}|$$
$$\phantom{H_2C=}COOROH$$

with a monohydric alcohol having 1 to 18 carbon atoms, vinyltoluene, about 1 to 4% by weight of a copolymerizable α,β-unsaturated carboxylic acid, and 5 to 30% by weight of a compound of the formula $$H_2C=C(CH_2)_{n-1}H$$
$$\phantom{H_2C=}|$$
$$\phantom{H_2C=}COOROH$$

wherein $n$ is an integer having a value of 1 to 2 and R is an alkylene group having 2 to 3 carbon atoms and having at least 2 carbon atoms extending in a chain between adjacent oxygen atoms, in a solution containing, dissolved therein, a butylated polymethylol melamine condensate and a free-radical polymerization initiator, the amount of condensate being from 15 to 60% by weight of the total weight of condensate and monomers, and the amount of free-radical initiator being from ½ to 3% by weight of the monomers.

8. A composition comprising a solution in an organic solvent of a reaction product obtained by copolymerizing, at a temperature of about 50 to 140° C. for a period of at least about 8 hours, but short of that resulting in gelation, until the product forms a clear film on baking at 150° C. for 30 minutes, a mixture of copolymerizable monoethylenically unsaturated monomers comprising methyl methacrylate, ethyl acrylate, and 5 to 30% by weight of β-hydroxyethyl methacrylate, in a solution containing, dissolved therein, a butylated polymethylol melamine condensate and a free-radical polymerization initiator, the amount of condensate being from 15 to 60% by weight of the total weight of condensate and monomers, and the amount of free-radical initiator being from ½ to 3% by weight of the monomers.

9. A composition comprising a solution in an organic solvent of a reaction product obtained by copolymerizing, at a temperature of about 50 to 140° C. for a period of at least about 8 hours, but short of that resulting in gelation, until the product forms a clear film on baking at 150° C. for 30 minutes, a mixture of copolymerizable monoethylenically unsaturated monomers comprising methyl methacrylate, styrene, ethyl acrylate, and 5 to 30% by weight of β-hydroxypropyl methacrylate, in a solution containing, dissolved therein, a butylated polymethylol melamine condensate and a free-radical polymerization initiator, the amount of condensate being from 15 to 60% by weight of the total weight of condensate and monomers, and the amount of free-radical initiator being from ½ to 3% by weight of the monomers.

10. A composition comprising a solution in an organic solvent of a reaction product obtained by copolymerizing, at a temperature of about 50 to 140° C. for a period of at least about 8 hours, but short of that resulting in gelation, until the product forms a clear film on baking at 150° C. for 30 minutes, a mixture of copolymerizable monoethylenically unsaturated monomers comprising styrene, ethyl acrylate, and 5 to 30% by weight of β-hydroxypropyl methacrylate, in a solution containing, dissolved therein, a butylated polymethylol melamine condensate and a free-radical polymerization initiator, the amount of condensate being from 15 to 60% by weight of the total weight of condensate and monomers, and the amount of free-radical initiator being from ½ to 3% by weight of the monomers.

11. A composition comprising a solution in an organic solvent of a reaction product obtained by copolymerizing, at a temperature of about 50 to 140° C. for a period of at least about 8 hours, but short of that resulting in gelation, until the product forms a clear film on baking at 150° C. for 30 minutes, a mixture of copolymerizable monoethylenically unsaturated monomers comprising methacrylic acid, ethyl acrylate, and 5 to 30% by weight of β-hydroxyethyl methacrylate, in a solution containing, dissolved therein, a butylated polymethylol melamine condensate and a free-radical polymerization initiator, the amount of condensate being from 15 to 60% by weight of the total weight of condensate and monomers, and the amount of free-radical initiator being from ½ to 3% by weight of the monomers.

12. A composition comprising a solution in an organic solvent of a reaction product obtained by copolymerizing, at a temperature of about 50 to 140° C. for a period of at least about 8 hours, but short of that resulting in gelation, until the product forms a clear film on baking at 150° C. for 30 minutes, a mixture of copolymerizable monoethylenically unsaturated monomers comprising methyl methacrylate, styrene, ethyl acrylate, and 5 to 30% by weight of β-hydroxyethyl methacrylate, in a solution containing, dissolved therein, a butylated polymethylol melamine condensate and a free-radical polymerization initiator, the amount of condensate being from 15 to 60% by weight of the total weight of condensate and monomers, and the amount of free-radical initiator being from ½ to 3% by weight of the monomers.

13. A composition comprising a solution in an organic solvent of a condensation product obtained by heating a solution in an organic solvent, at a temperature of about 50 to 140° C. for a period of at least about a half hour, but short of that resulting in gelation, until the solution clears and is capable of forming a clear film on baking at 150° C. for 30 minutes, of a mixture of (1) 15 to 60% by weight of a butylated polymethylol melamine and (2) 85 to 40% by weight respectively of a copolymer of a mixture of copolymerizable monoethylenically unsaturated monomers comprising at least one ester of an acid of the formula

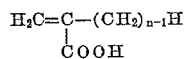

with a monohydric alcohol having 1 to 18 carbon atoms and 5 to 30% by weight of a compound of the formula

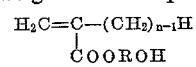

wherein $n$ is an integer having a value of 1 to 2 and R is an alkylene group having 2 to 3 carbon atoms and having at least 2 carbon atoms extending in a chain between adjacent oxygen atoms.

14. A composition comprising a solution in an organic solvent of a condensation product obtained by heating a solution in an organic solvent, at a temperature of about 50 to 140° C. for a period of at least about a half hour, but short of that resulting in gelation, until the solution clears and is capable of forming a clear film on baking at 150° C. for 30 minutes, of a mixture of (1) 15 to 60% by weight of a butylated polymethylol melamine and (2) 85 to 40% by weight respectively of a copolymer of a mixture of copolymerizable monoethylenically unsaturated monomers comprising at least one ester of an acid of the formula

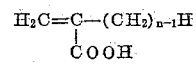

with a monohydric alcohol having 1 to 18 carbon atoms, about 1 to 4% by weight of a copolymerizable α,β-unsaturated carboxylic acid, and 5 to 30% by weight of a compound of the formula

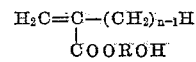

wherein $n$ is an integer having a value of 1 to 2 and R is an alkylene group having 2 to 3 carbon atoms and having at least 2 carbon atoms extending in a chain between adjacent oxygen atoms.

15. A composition comprising a solution in an organic solvent of a condensation product obtained by heating a solution in an organic solvent, at a temperature of about 50 to 140° C. for a period of at least about a half hour, but short of that resulting in gelation, until the solution clears and is capable of forming a clear film on baking at 150° C. for 30 minutes, of a mixture of (1) 15 to 60% by weight of a butylated polymethylol melamine and (2) 85 to 40% by weight respectively of a copolymer of a mixture of copolymerizable monoethylenically unsaturated monomers comprising at least one ester of an acid of the formula

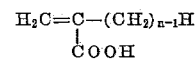

with a monohydric alcohol having 1 to 18 carbon atoms, styrene, about 1 to 4% by weight of a copolymerizable α,β-unsaturated carboxylic acid, and 5 to 30% by weight of a compound of the formula

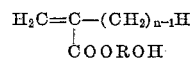

wherein $n$ is an integer having a value of 1 to 2 and R is an alkylene group having 2 to 3 carbon atoms and having at least 2 carbon atoms extending in a chain between adjacent oxygen atoms.

16. A composition comprising a solution in an organic solvent of a condensation product obtained by heating a solution in an organic solvent, at a temperature of about 50 to 140° C. for a period of at least about a half hour, but short of that resulting in gelation, until the solution clears and is capable of forming a clear film on baking at 150° C. for 30 minutes, of a mixture of (1) 15 to 60% by weight of a butylated polymethylol melamine and (2) 85 to 40% by weight respectively of a copolymer of a mixture of copolymerizable monoethylenically unsaturated monomers, comprising at least one ester of an acid of the formula

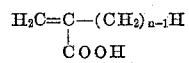

with a monohydric alcohol having 1 to 18 carbon atoms, vinyltoluene, about 1 to 4% by weight of a copolymerizable α,β-unsaturated carboxylic acid, and 5 to 30% by weight of a compound of the formula

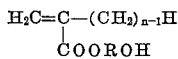

wherein $n$ is an integer having a value of 1 to 2 and R is an alkylene group having 2 to 3 carbon atoms and having at least 2 carbon atoms extending in a chain between adjacent oxygen atoms.

17. A composition comprising a solution in an organic solvent of a condensation product obtained by heating a solution in an organic solvent, at a temperature of about 50 to 140° C. for a period of at least about a half hour, but short of that resulting in gelation, until the solution clears and is capable of forming a clear film on baking at 150° C. for 30 minutes, of a mixture of (1) 15 to 60% by weight of a butylated polymethylol melamine and (2) 85 to 40% by weight respectively of a copolymer of a mixture of copolymerizable monoethylenically unsaturated monomers comprising methyl methacrylate, ethyl acrylate, and 5 to 30% by weight of β-hydroxyethyl methacrylate.

18. A composition comprising a solution in an organic solvent of a condensation product obtained by heating a solution in an organic solvent, at a temperature of about 50 to 140° C. for a period of at least about a half hour, but short of that resulting in gelation, until the solution clears and is capable of forming a clear film on baking at 150° C. for 30 minutes, of a mixture of (1) 15 to 60% by weight of a butylated polymethylol melamine and (2) 85 to 40% by weight respectively of a copolymer of a mixture of copolymerizable monoethylenically unsaturated monomers comprising methyl methacrylate, styrene, ethyl acrylate, and 5 to 30% by weight of β-hydroxypropyl methacrylate.

19. A composition comprising a solution in an organic solvent of a condensation product obtained by heating a solution in an organic solvent, at a temperature of about 50 to 140° C. for a period of at least about a half hour, but short of that resulting in gelation, until the solution clears and is capable of forming a clear film on baking at 150° C. for 30 minutes, of a mixture of (1) 15 to 60% by weight of a butylated polymethylol melamine and (2) 85 to 40% by weight respectively of a copolymer of a mixture of copolymerizable monoethylenically unsaturated monomers comprising styrene, ethyl acrylate, and 5 to 30% by weight of β-hydroxypropyl methacrylate.

20. A composition comprising a solution in an organic solvent of a condensation product obtained by heating a solution in an organic solvent, at a temperature of about 50 to 140° C. for a period of at least about a half hour, but short of that resulting in gelation, until the solution clears and is capable of forming a clear film on baking at 150° C. for 30 minutes, of a mixture of (1) 15 to 60% by weight of a butylated polymethylol melamine and (2) 85 to 40% by weight respectively of a copolymer of a mixture of copolymerizable monoethylenically unsaturated monomers comprising methacrylic acid, ethyl acrylate, and 5 to 30% by weight of β-hydroxyethyl methacrylate.

21. A composition comprising a solution in an organic solvent of a condensation product obtained by heating a solution in an organic solvent, at a temperature of about 50 to 140° C. for a period of at least about a half hour, but short of that resulting in gelation, until the solution clears and is capable of forming a clear film on baking at 150° C. for 30 minutes, of a mixture of (1) 15 to 60% by weight of a butylated polymethylol melamine and (2) 85 to 40% by weight respectively of a copolymer of a mixture of copolymerizable monoethylenically unsaturated monomers comprising methyl methacrylate, styrene, ethyl acrylate, and 5 to 30% by weight of β-hydroxyethyl methacrylate.

22. A composition comprising a solution in an organic solvent of a condensation product obtained by heating a solution in an organic solvent, at a temperature of about 50 to 140° C. for a period of at least about a half hour, but short of that resulting in gelation, until the solution clears and is capable of forming a clear film on baking at 150° C. for 30 minutes, of a mixture of (1) 15 to 60% by weight of a butylated polymethylol melamine and (2) 85 to 40% by weight respectively of a copolymer of a mixture of copolymerizable monoethylenically unsaturated monomers comprising 5 to 30% by weight of a compound of the formula

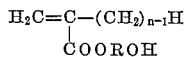

wherein $n$ is an integer having a value of 1 to 2 and R is an alkylene group having 2 to 3 carbon atoms and having at least 2 carbon atoms extending in a chain between adjacent oxygen atoms and 95 to 70% by weight of at least one other monomer selected from the group consisting of (a) copolymerizable α,β-unsaturated carboxylic acids and (b) other copolymerizable monoethylenically unsaturated monomers devoid of hydroxyl groups, the proportion of acid from group (a) not exceeding 4% by weight in the copolymer.

References Cited by the Examiner

UNITED STATES PATENTS

| 2,681,897 | 6/1954 | Frazier et al. | 260—45.2 |
| 2,809,911 | 10/1957 | Richardson | 260—45.3 |
| 2,918,391 | 12/1959 | Hornibrook | 260—45.2 |
| 3,082,184 | 3/1963 | Falgiatore et al. | 260—30.4 |

OTHER REFERENCES

Chatfield: Paint and Varnish Manufacture; George Newnes Ltd., London; 1955, p. 95; TP 935 C4.

MORRIS LIEBMAN, *Primary Examiner.*

DANIEL ARNOLD, LEON J. BERCOVITZ, *Examiners.*